United States Patent
Brisley et al.

(10) Patent No.: US 6,753,294 B1
(45) Date of Patent: Jun. 22, 2004

(54) CATALYTIC WALL-FLOW FILTER

(75) Inventors: Robert James Brisley, Cambridge (GB); Martyn Vincent Twigg, Cambridge (GB); Anthony John Joseph Wilkins, Essex (GB)

(73) Assignee: Johnson Matthey Public Limited Company, London (GB)

( * ) Notice: Subject to any disclaimer, the term of this patent is extended or adjusted under 35 U.S.C. 154(b) by 223 days.

(21) Appl. No.: 09/807,571

(22) PCT Filed: Aug. 14, 2000

(86) PCT No.: PCT/GB00/03064

§ 371 (c)(1),
(2), (4) Date: Jul. 23, 2001

(87) PCT Pub. No.: WO01/12320

PCT Pub. Date: Feb. 22, 2001

(30) Foreign Application Priority Data

Aug. 13, 1999 (GB) ............................................. 9919013

(51) Int. Cl.$^7$ ............................................... B01J 20/02
(52) U.S. Cl. ...................................... 502/439; 502/400
(58) Field of Search ............................... 502/439, 302, 502/311, 350, 355, 340, 344, 339, 65, 305, 527.19

(56) References Cited

U.S. PATENT DOCUMENTS

| | | |
|---|---|---|
| 4,515,758 A | 5/1985 | Domesle et al. |
| 4,857,089 A | 8/1989 | Kitagawa et al. |
| 4,902,487 A * | 2/1990 | Cooper et al. ........... 423/215.5 |
| 5,089,237 A | 2/1992 | Schuster et al. |
| 5,492,679 A | 2/1996 | Ament et al. |
| 5,519,993 A | 5/1996 | Rao et al. |
| 5,750,084 A * | 5/1998 | Tsutsumi et al. ........ 423/239.1 |
| 5,758,496 A | 6/1998 | Rao et al. |

FOREIGN PATENT DOCUMENTS

| | | |
|---|---|---|
| EP | 0 056 584 | 7/1982 |
| EP | 0 277 012 | 1/1988 |
| EP | 0 341 832 | 11/1989 |
| EP | 0 736 713 | 2/1997 |
| EP | 0 814 242 | 12/1997 |
| EP | 0 834 343 | 4/1998 |
| WO | 99/39809 | 8/1999 |
| WO | 99/47260 | 9/1999 |
| WO | 00/29726 | 5/2000 |
| WO | 00/74823 | 12/2000 |

OTHER PUBLICATIONS

International Search Report dated Dec. 19, 2000.
British Search Report dated Jan. 7, 2000.

* cited by examiner

Primary Examiner—Stanley S. Silverman
Assistant Examiner—Edward M. Johnson
(74) Attorney, Agent, or Firm—RatnerPrestia

(57) ABSTRACT

A wall-flow filter for an exhaust system of a combustion engine comprises: a plurality of channels in honeycomb arrangement, wherein at least some of the channels are plugged at an upstream end and at least some of the channels not plugged at the upstream end are plugged at a downstream end; an oxidation catalyst on a substantially gas impermeable zone at an upstream end of the channels plugged at the downstream end; and a gas permeable filter zone downstream of the oxidation catalyst for trapping soot, in that in an exhaust system, preferably a diesel exhaust system, the oxidation catalyst, which preferably includes a platinum group metal, is capable of generating sufficient $NO_2$ from NO to combust the trapped soot continuously at a temperature less than 400° C.

24 Claims, 1 Drawing Sheet

CATALYTIC WALL-FLOW FILTER

This invention relates to a wall-flow filter, and in particular to a wall-flow filter including a catalyst.

Exhaust gases of a combustion engine contain a number of components linked with damaging health and the environment. One of these is the soot component. A way of controlling the amount of soot in the exhaust gas is to use a filter downstream from the exhaust manifold, the idea being to burn (oxidise) soot trapped on the filter, thereby regenerating the filter.

A known type of soot filter is the wall-flow filter. This filter can be made, for example, from a ceramic monolith including channels in a honeycomb arrangement. A typical embodiment has each channel plugged at one or other end thereof, and at the opposite end to the laterally and vertically adjacent channels. When viewed from either end, the alternately plugged and open ends of the channels take on the appearance of a chessboard. The ceramic material from which the filter can be made has a pore size sufficient to allow gas permeability so that the pressure drop across the filter is relatively low, but which prevents the passage of soot. Thus soot is filtered from the exhaust gases.

EP-A-0341832 and corresponding case U.S. Pat. No. 4,902,487 describes a process and treatment system for soot-containing exhaust gas, the gas also containing nitric oxide (NO), which process comprising passing the gas unfiltered over an oxidation catalyst to convert NO to nitrogen dioxide ($NO_2$), collecting the soot on a downstream filter and combusting the collected soot continuously at under 400° C. by reaction with the $NO_2$; and there have been recent proposals to add further steps to that process and system, for example nitrogen oxides (NOx) removal steps (see EP-A-0758713). EP-A-0341832 and U.S. Pat. No. 4,902,487 describe Johnson Matthey's Continuously Regenerating Trap (CRT™) technology and are incorporated herein by reference.

In the process described in EP-A-0341832 the oxidation step and the filter combustion step are carried out in two different honeycombs each in a separate shell or can or mounted within a single can. However, there are problems in adopting either embodiment. A problem with the former embodiment is that there can be limited space under-floor on a vehicle to mount each can. In the latter embodiment, a problem is that the construction of the can is complicated. If further downstream process steps are required these problems are exacerbated.

We have now found that these and other problems can be overcome or reduced by carrying out each of the treatment steps on a single wall-flow filter or single "brick". U.S. Pat. No. 5,089,237 discloses a soot burn-off filter for an exhaust system of a combustion engine, which filter includes a porous ceramic honeycomb block having channels plugged alternately at the ends to define a flow path through the partition walls of the channels, the walls at the inlet end having a catalytic coating. We understand from this document that the filter is used in a discontinuous process in which soot is allowed to accumulate on the filter and is periodically burnt off by raising the temperature and ensuring that sufficient oxygen ($O_2$) is available. Owing to the combustion of a substantial quantity of soot in a relatively small space, -temperatures high enough to produce destructive effects on the filter are readily attained. To limit such effect the filter of U.S. Pat. No. 5,089,237 provides a gas-tight region in the partition walls at the downstream end of the upstream channels. Although the catalytic coating is stated to lower the temperature at which soot combustion takes place, it evidently does not make the gas-tight region unnecessary.

According to one aspect, the invention provides a wall-flow filter for an exhaust system of a combustion engine, which filter comprises: a plurality of channels in honeycomb arrangement, wherein at least some of the channels are plugged at an upstream end and at least some of the channels not plugged at the upstream end are plugged at a downstream end; an oxidation catalyst on a substantially gas impermeable zone at an upstream end of the channels plugged at the downstream end; and a gas permeable filter zone downstream of the oxidation catalyst for trapping soot, characterised in that in an exhaust system the oxidation catalyst is capable of generating sufficient $NO_2$ from NO to combust the trapped soot continuously at a temperature less than 400° C.

The term "continuously" means that collected soot is combusted in a continuous exhaust gas flow; it thus excludes (except in the event of malfunction) the combustion of a large amount of accumulated soot. It does, however, encompass relatively minor variations in the level of collected soot and in the gas composition in response to normal variations of engine operating conditions and to short-term injection of reductant or NOx specific reactants in order to remove NOx downstream of the filter.

For the avoidance of doubt, by "absorb" herein, we mean to hold a relevant species on a relevant surface of a body (otherwise "adsorb") and/or to hold a species below the surface of a body i.e. within the body.

Exhaust gases from a combustion engine also contain unburnt hydrocarbon (HC), carbon dioxide ($CO_2$), carbon monoxide (CO), steam ($H_2O(g)$) and nitrogen ($N_2$). Its content of NOx comprises NO and $NO_2$, the majority being NO. At least sufficient NOx should be present to provide, after the catalytic oxidation of NO to $NO_2$, at least enough $NO_2$ to oxidise the collected soot as it is formed, or after a small accumulation of soot. As described in the above mentioned EP-A-0341832, and in PCT application no. GB00/02062, additional NOx may be supplied by e.g. injecting nitric acid or the product of local oxidation of ammonia ($NH_3$) or an ammonia precursor, such as urea.

The filter of the present invention provides a gaseous flow path defined in part by the open ends of each channel plugged at the downstream end, and the pores of the gas permeable wall of the channel. Soot in the gaseous exhaust enters the channel, but cannot pass through the pores of the channel wall. Thus soot is filtered from the gaseous exhaust by the pores of the filter. Furthermore, the gaseous exhaust is forced to flow over the entire zone supporting the oxidation catalyst, as the wall of the filter on which it is supported is substantially gas impermeable. This achieves the best possible yield of $NO_2$ from NO at a given temperature and also avoids caking the catalyst in soot.

Preferably, the arrangement of channels plugged at the upstream and downstream ends of the filter is such that each channel of the filter is plugged at one or other end thereof, and at the opposite end to the laterally and vertically adjacent channels, although other configurations can be used. For example, in an arrangement of striated appearance, a first longitudinal array of channels is plugged at one end, and the longitudinal arrays of channels either side of the first array are plugged at the opposite ends of the filter, and so on. The provision of a filter including at least some unplugged channels, thereby to act as a by-pass to the filter channels, is also within the ambit of the present invention. The unplugged channels can also be used to introduce a reactant required downstream of the wall-flow filter zone.

The channels are preferably square in cross-section but can be any other shape such as circular, rectangular, hexagonal or triangular.

Preferably, the oxidation catalyst, which is advantageously a compound including a platinum group metal (PGM), such as platinum (Pt) or palladium (Pd), blocks the filter pores in the gas impermeable zone, thereby making the zone substantially gas impermeable. Filter-grade materials for making the filter suitably have a mean pore diameter in the range 0.4 to $20 \times 10^{-3}$ inch (1 to 50 $\mu$m) for gas treatments at about atmospheric pressure, but other values may be more appropriate for liquids or at higher or lower pressures. Although it is possible to manufacture a filter in which the filter material itself is gas impermeable or the pore size is graded so that the upstream part of channels plugged at the downstream end are gas impermeable but gas permeability increases towards the filter zone, we prefer that the filter material is of uniform pore size and that zones supporting the catalyst are rendered gas-impermeable by applying materials to them. When the filter is ceramic, it may be the product of shaping (e.g. by extrusion) and a composition containing sufficient fugitive material to leave, once removed e.g. by calcination, the required pores. The filter, whether ceramic or metal, may be the product of moulding and sintering a powder, possibly via foam. Whilst the filter material can be metal, we prefer it to be made of a ceramic material such as cordierite, alumina, mullite, silicon carbide, zirconia or sodium/zirconia/phosphate. The honeycomb has typically at least 50 cells per square inch ((cpsi)(7.75 cm$^{-2}$), possibly more, e.g. up to 800 cpsi (124 cm$^{-2}$). Generally the range 100–600 cpsi (15.5–93 cm$^{-2}$) is preferred, of which 200–400 cpsi (31–62 cm$^{-2}$) is most preferred.

According to preferred embodiments, the downstream channels of the filter include a catalyst for a NOx absorber (or NOx trap) and optionally a NOx reduction catalyst or Selective Catalytic Reduction (SCR) catalyst downstream of the NOx catalyst or Selective Catalytic Reduction (SCR) catalyst downstream of the NOx absorber. The combination of CRT™ technology and the SCR of NOx with a nitrogen-containing compound, such as NH$_3$ or urea, is described in our WO 99/39809. In a further embodiment, the channels upstream of the oxidation catalyst can include a sulphur oxides (SOx) absorber (SOx trap). The upstream SOx absorber can be included in embodiments with or without the NOx absorber or NOx reduction catalyst or SCR catalyst. As with the zone including the oxidation catalyst, in embodiments including one or more of the SOx absorber, NOx absorber or NOx reduction catalyst or SCR catalyst, the zones of each catalyst or absorber is substantially gas impermeable, and the gas impermeability is preferably provided by the catalyst or absorber or the catalyst or absorber support.

The NOx absorber/trap comprises a compound including an alkali metal, an alkaline earth, rare earth metal or transition metal or a mixed oxide capable of forming nitrates and/or nitrites of adequate stability in non-reducing conditions and of evolving nitrogen oxides and/or nitrogen in reducing conditions, an oxidation catalyst, preferably Pt, and a reduction catalyst, preferably rhodium (Rh). Composite oxides of e.g. alkaline earth metal and copper can also be used, such as (adopting periodic table letter codes) Ba—Cu—O or MnO$_2$—BaCuO$_2$, possibly with added CeO$_2$, or Y—Ba—Cu—O and Y—Sr—Co—O. The NOx reduction catalyst will generally include one or more PGM, but especially Pt, Pt/Rh, Pd/Rh or Pt/Pd/Rh. The SCR catalyst can be a copper-based material, Pt, a mixed oxide of vanadia (V$_2$O$_5$) and titania (TiO$_2$) or a zeolite or mixtures of two or more thereof and is preferably V$_2$O$_5$/WO$_3$/TiO$_2$. Reference can be made to our WO 99/55446 and WO 99/39809 for further information. The SOx absorber can include an alkaline earth metal oxide or alkali metal oxide or mixtures of any two or more thereof. Reference can be made to our EP-A-0814242 for further details.

In an exhaust system including an embodiment of the present invention including a NOx reduction catalyst or an SCR catalyst, the system can include means to inject reductant and/or NOx-specific reactant continuously or intermittently upstream of these catalysts. The oxidation catalyst of the invention can be in two parts, optimised respectively for oxidation of HC and CO and for conversion of NO to NO$_2$. In the embodiment including both the NOx absorber and reduction catalyst, they can be in distinct regions of the filter or associated, for example co-precipitated or co-impregnated or present as sandwiched layers or as relatively fine (e.g. 1–500 $\mu$m) particles or overlayed in different washcoats.

Preferably, the or each catalyst or absorber is supported on a high-surface oxide support, preferably alumina (Al$_2$O$_3$), TiO$_2$ or zirconia (ZrO$_2$), but the or each catalyst or absorber can be supported directly by the filter i.e. without additional high-surface oxide support.

Desirably, the catalyst(s) and, where present, absorber(s), whether supported on a high surface area oxide or directly by the filter, increases the local pressure-drop of the wall-flow filter by a factor of at least 2, and preferably up to 10. In one embodiment, the filter zone itself can be catalysed. A suitable catalyst is an oxidation catalyst to assist in combusting the soot, but more preferably the catalyst includes a base metal such as magnesium oxide (MgO) and most preferably the catalyst is a combination of lanthanum (La), caesium (Cs) and vanadium pentoxide (V$_2$O$_5$). Where the base metal is MgO, a preferred catalyst is Pt on MgO. If the surfaces of the pores of the filter zone are to carry a catalyst, the pore diameter may be in the upperfifth of the above mentioned range or even higher, but such coating should be thin enough to avoid the need for large pores that would weaken the filter structurally.

"Alkali metal" as defined herein includes potassium (K), sodium (Na), lithium (Li), rubidium (Rb) or Cs; "alkaine earth metal" includes barium (Ba), calcium (Ca), strontium (Sr) or magnesium (Mg); and "rare earth metal" includes cerium (Ce), La or yttrium (Y) or other lanthanides.

The filter according to the invention can be packaged in any convenient way. Packaging materials commonly used in the art include a ceramic or steel wire mesh for wrapping and insulating the filter core; end plugs to prevent exhaust gas leaks through the wire mesh or to protect the mat; and steel for the shell or can. A suitable header can be used to provide the transition between the inlet and outlet pipes and the filter cross-section. Ports for the injection of additives or the introduction of sensor devices for on-board diagnostics can also be provided, where necessary.

The filter of the present invention can be made by methods known in the art, as exemplified by way of illustration only herebelow. In this aspect, the invention provides a method of making a filter according to the invention by stage-wise dipping in solutions and/or dispersions of precursors of the catalyst or absorber. In preferred features of this method, the method includes the steps of coating a wall of a channel of a wall-flow monolith with at least one material effective to decrease locally the gas permeability of the wall; and then applying to the coated wall at least one catalyst or absorber and optionally calcining the coated monolith.

However, we prefer to use the apparatus and method described in our WO 99/47260. To this end according to a further aspect, the invention provides a method of making a filter according to the invention comprising, in either order, the steps of: (i) locating a containment means on top of a wall-flow monolith having a plurality of channels in honeycomb arrangement, wherein at least some of the channels are plugged at an upstream end and at least some of the channels not plugged at the upstream end are plugged at a downstream end; and (ii) dosing a pre-determined quantity of a liquid being a washcoat slurry or a solution of a catalyst or catalyst precursor, or a mixture of the two, into the containment means; and then (iii) by applying pressure or a vacuum, drawing said liquid component into at least a portion of the open wall-flow monolith channels, and retaining substantially all of the quantity within the channels.

In an alternative embodiment, the above method is applied to an unplugged monolith and the channels are plugged after the coatings have been applied. If one end of a channel is to be plugged, the method includes the step of removing coating applied to that end prior to plugging. Alternatively, the method includes the step of coating only the ends of channels which are predetermined to remain unplugged, i.e. the coating is not applied to an end of a channel which is to be plugged.

In a preferred feature, the method according to the invention comprises the step of applying a resist to a region where application of a washcoat or a solution or suspension of a catalyst or catalyst precursor or mixture thereof is to be delayed. The resist can be a wax or stearic acid, for example. exhaust system having a filter according to the invention. Preferably, the combustion engine is a diesel engine.

In another aspect, the invention provides a vehicle fitted with a combustion engine, preferably a diesel engine, including an exhaust system having a filter according to the invention.

According to a further aspect of the invention there is provided the use of a filter according to the invention for treating exhaust gases from a combustion engine, preferably a diesel engine.

In a further aspect, the invention provides a process for removing by combustion soot deposited on a filter disposed in an exhaust system of a combustion engine wherein exhaust gas containing NO is initially passed without filtering over an oxidation catalyst to convert NO in the exhaust gas to $NO_2$ prior to filtering to remove soot and wherein the exhaust gas containing $NO_2$ is then used to combust the soot trapped on the filter, the amount of NO converted to $NO_2$ being sufficient to enable combustion of soot trapped on the filter to proceed at a temperature less than 400° C., characterised in that the filter is a wall-flow filter, which filter comprises: a plurality of channels in honeycomb arrangement, wherein at least some of the channels are plugged at an upstream end and at least some of the channels not plugged at the upstream end are plugged at a downstream end; the oxidation catalyst is on a substantially gas impermeable zone at an upstream end of the channels plugged at the downstream end; and a gas permeable filter zone downstream of the oxidation catalyst for trapping soot In order that the invention may be more fully understood, reference will be made to the accompanying drawing which shows an elevated cross-sectional view of one embodiment of a filter according to the present invention.

Figure 1:
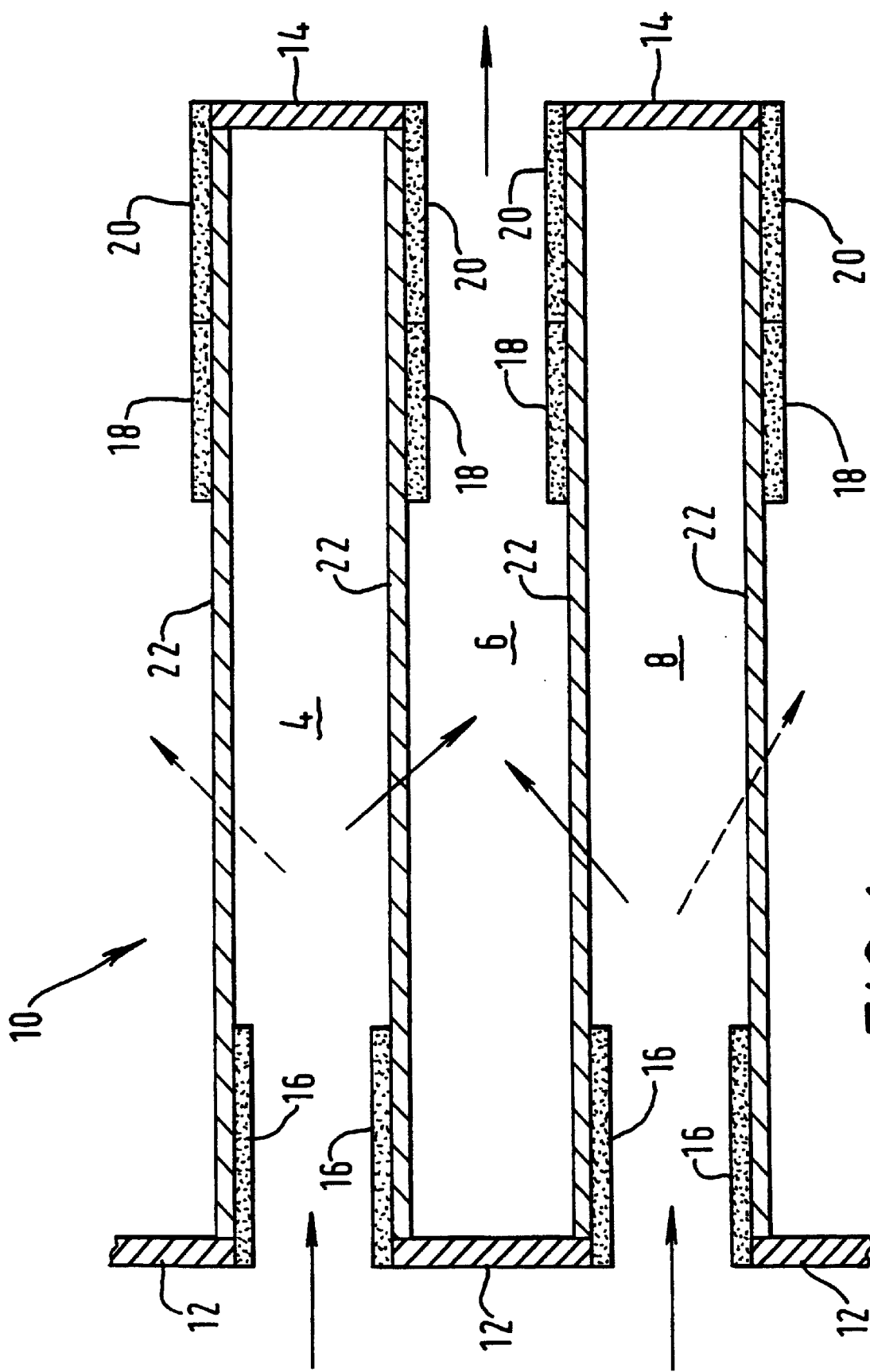
FIG. 1 shows three adjacent channels 4, 6, 8 of a cordierite honeycomb filter 10, having 200 cpsi (31 $cm^{-2}$) and, before use, pores of approximately 10 μm in diameter. Channel 6 is plugged at 12 at the upstream end of the filter 10 and the other two channels 4,8 are each plugged at 14 at the downstream end of the filter 10. Thus, gas entering two channels 4,8 are each plugged at 14 at the downstream end of the filter 10. Thus, gas entering channel 6 at the upstream end must pass through the walls of the channel 6 to reach the downstream end of the filter 10. Over a region or zone extending downstream of the opening to channel 6, the walls carry coating 16 comprising an $Al_2O_3$ washcoat support and a metallic Pt oxidation catalyst. Coating 16 obstructs the pores of the filter walls. Over a region or zone extending upstream from the outlet to filter 10, channels 4 and 8 carry coatings 18, 20 comprising a NOx absorber composition including barium oxide (BaO) and a NOx reduction catalyst composition comprising Pt/Rh. In order to make the coatings 18, 20, the zone to be coated with coating 20 is first covered with a resist, such as wax or stearic acid, during application of coating 18. In this embodiment the regions of the cordierite filter 10 including coatings 16 and 18 are rendered gas impermeable by the presence of the coating. Between coatings 16 and 18, the walls of the channels 4, 6, 8 remain gas permeable and provide a filter zone 22.

Diesel exhaust gas entering the reactor undergoes oxidation of HC, CO and NO in presence of coating 16. Soot in the gas is collected on the walls of channels 4, 6, 8 at filter zone 22 and is combusted by $NO_2$ derived from the oxidation of NO. The gas, containing soot combustion products, passes through the wall of the filter and contacts the NOx trap coating 18, which absorbs NO. When sufficient $NO_2$ is stored (as the nitrate, for example), which can be ascertained by the on-board diagnostics of the vehicle, coating 18 can be regenerated with a rich pulse of gaseous exhaust i.e. gas including excess reductant such as HC. The rich/lean cycling can be controlled using the vehicle's engine management system. The resulting NOx-rich gas contacts coating 20 including the NOx reduction catalyst, which effects oxidation of HC and CO and reduction of NOx to $N_2$. Alternatively, where coating 20 is a SCR catalyst, NOx-specific reactant such as ammonia can be injected at an upstream end of the filter at a rate and temperature permitting unreacted ammonia to slip oxidation catalyst 16 and contact absorber 18, which it regenerates, and catalyst 20, over which it reduces NOx to $N_2$.

In order that one method of manufacture of the filter according to the invention may be more fully understood, the following Example is provided by way of illustration only.

The substrate is a filter grade cordierite honeycomb monolith of square cross-section channels 30 mm in diameter and 150 mm long and having a mean pore diameter 10 μm in which half of the passages both ends of the monolith are plugged so that each channel of the monolith is plugged at one or other end thereof, and at the opposite end to the laterally and vertically adjacent channels.

One end of the monolith is labelled 'inlet' and is dipped 25 mm deep into an aqueous dispersion of hydrated $Al_2O_3$, then withdrawn, dried at 100° C. and allowed to cool. The inlet end is then dipped to the same depth in an aqueous solution of 2% w/w platinum chloride. The monolith is dried as before.

The unlabelled end of the monolith is prepared by firstly dipping it to a depth of 25 mm in turn in an aqueous solution of sodium stearate and then drying the resulting monolith at 100° C. The resulting monolith is then dipped in aqueous hydrochloric acid and then water (two changes), to rinse off solubles. This procedure produces an insoluble stearic acid layer as a resist, which excludes any materials applied in neutral or acidic solution. The resist-coated monolith is then dipped to a depth of 50 mm, into an aqueous solution of barium acetate and platinum chloride, and then dried. This dip applies these materials to an area upstream of the resist-coated area. Then the coated monolith is dipped in 5% w/w aqueous sodium hydroxide to a depth of 25 mm to dissolve the stearic acid resist. This step is repeated twice and is followed by two rinses with water. The coated monolith is then dried. The resulting monolith is then dipped to a depth of 25 mm in the $Al_2O_3$ dispersion used at the inlet end, and described above. The coated monolith is then dried. Finally, to a depth of 25 mm in Pt/Rh solution. The coated monolith is then dried.

The resulting monolith is then calcined at 500° C. for 1 hr to convert the metal salts to oxides or metals and to develop the surface area of the $Al_2O_3$ to provide a filter according to the invention.

What is claimed is:

1. A wall-flow filter for an exhaust system of a combustion engine, which filter comprises: a honeycomb arrangement defining a plurality of first channels plugged at an upstream end and a plurality of second channels not plugged at the upstream end but plugged at a downstream end; an oxidation catalyst on a substantially gas impermeable zone at an upstream end of the second channels; and a catalyst-free gas permeable filter zone downstream of the oxidation catalyst for trapping soot, wherein the oxidation catalyst is capable of generating sufficient $NO_2$ from NO to combust the trapped soot continuously at a temperature less than 400° C.

2. A filter according to claim 1, wherein the arrangement of the first and second channels is such that laterally and vertically adjacent channels are plugged at opposite ends.

3. A filter according to claim 1, wherein the honeycomb arrangement further comprises a plurality of third channels which are unplugged to provide a flow-through by-pass to the first and second channels.

4. A filter according to any of claim 1, wherein the oxidation catalyst includes a platinum group metal.

5. A filter according to claim 4, wherein the platinum group metal comprises at least one of Pt and Pd.

6. A filter according to claim 1, further comprising a NOx absorber on a substantially gas impermeable zone on the first channels.

7. A filter according to claim 6, wherein the NOx absorber includes an alkali metal, an alkaline earth metal or rareearth metal or mixtures of any two or more thereof.

8. A filter according to claim 6, wherein the NOx absorber includes an oxide of at least one of an alkali metal and an alkaline earth metal.

9. A filter according to claim 6, further comprising a NOx reduction catalyst or a Selective Catalytic Reduction (SCR) catalyst on a substantially gas impermeable zone on the first channels downstream of the NOx absorber.

10. A filter according to claim 9, wherein the SCR catalyst includes copper-based materials, Pt, a mixed oxide of vanadium and titanium or a zeolite or mixtures of two or more thereof.

11. A filter according to claim 9, wherein the NOx reduction catalyst comprises at least one platinum group metal.

12. A filter according to claim 11, wherein the platinum group metal is selected from the group consisting of Pt, Pt/Rh, Pd/Rh or Pt/Pd/Rh.

13. A filter according to claim 9, wherein the SCR catalyst comprises $V_2O_5/WO_2/TiO_2$.

14. A filter according to claim 6, wherein the alkali metal is potassium, sodium, lithium, rubidium or caesium or a mixture of any two or more thereof, the alkaline earth metal is barium, calcium, strontium or magnesium or a mixture of any two or more thereof or the rare earth metal is cerium, lanthanum or yttrium or other lanthanide or a mixture of any two or more thereof.

15. A filter according to claim 1, further comprising a SOx absorber on a substantially gas impermeable zone on the second channels upstream of the oxidation catalyst.

16. A filter according to claim 15, wherein the SOx absorber includes an alkaline earth metal oxide or alkali metal oxide or mixtures of any two or more thereof.

17. A filter according to claim 16, wherein the alkali metal is potassium, sodium, lithium, rubidium or caesium or a mixture of any two or more thereof, and the alkaline earth metal is barium, calcium, strontium or magnesium or a mixture of any two or more thereof.

18. A filter according to claim 1, further comprising a high-surface oxide support comprising alumina, titania or zirconia for supporting the catalyst.

19. A filter according to claim 1, wherein the support supporting the catalyst renders the zone including the catalyst substantially gas impermeable.

20. A filter according to claim 1, wherein the presence of the catalyst increases the local pressure drop of the wall-flow filter by a factor of at least 2.

21. A combustion engine including an exhaust system having a filter according to claim 1.

22. A diesel engine according to claim 21.

23. A vehicle fitted with a combustion engine according to claim 21.

24. A filter according to claim 1, wherein the presence of the catalyst increases the local pressure drop of the wall-flow filter by a factor of at least 10.

* * * * *

UNITED STATES PATENT AND TRADEMARK OFFICE
CERTIFICATE OF CORRECTION

PATENT NO. : 6,753,294 B1
DATED : August 2, 2004
INVENTOR(S) : Robert James Brisley et al.

It is certified that error appears in the above-identified patent and that said Letters Patent is hereby corrected as shown below:

Title page,
Item [56], References Cited, FOREIGN PATENT DOCUMENTS, delete
"EP    0 736 713    2/1997" and insert therefor -- EP    0 736 503    10/1996 --;
insert -- EP    0 758 713    2/1997 --.

Column 7,
Line 36, after "according to," delete "any of."
Line 44, delete "rereearth" and insert therefor -- rare earth --.

Signed and Sealed this

Twelfth Day of October, 2004

JON W. DUDAS
*Director of the United States Patent and Trademark Office*